Figures 1, 2:
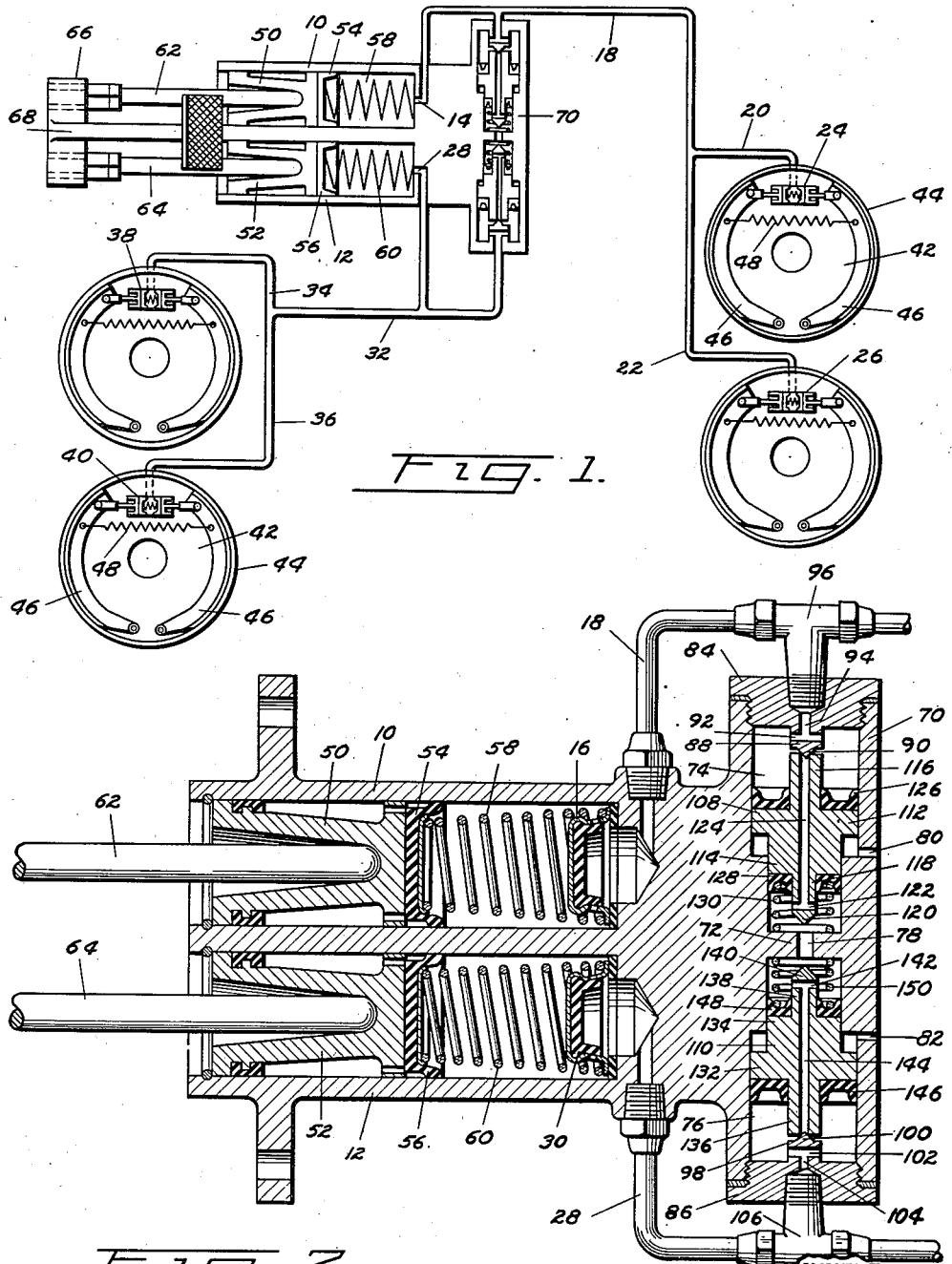

Dec. 22, 1936.   H. C. BOWEN   2,065,044
HYDRAULIC BRAKE
Filed Oct. 31, 1934

INVENTOR.
HERBERT C. BOWEN
BY Williams, Bradbury, McCalls & Hinkle.
ATTORNEYS.

Patented Dec. 22, 1936

2,065,044

UNITED STATES PATENT OFFICE 2,065,044

HYDRAULIC BRAKE

Herbert C. Bowen, Detroit, Mich., assignor to Hydraulic Brake Company, Detroit, Mich., a corporation of California Application October 31, 1934, Serial No. 750,789

10 Claims. (Cl. 60—54.5)

This invention relates to brakes for motor vehicles, and more particularly to hydraulically actuated brakes for motor vehicles.

Broadly the invention comprehends a hydraulic brake system wherein separate compression devices connected by separate conduits to separate pairs of braking structures are interconnected by an equalizer which also functions as a safety device in the event of leakage in or breakage of either conduit.

In a preferred embodiment of the invention two separate hydraulic brake systems, one for applying the brakes associated with the front wheels of a vehicle and the other for applying the brakes associated with the rear wheels of the vehicle, are arranged for concomitant operation by a single foot pedal lever and are interconnected by mechanism constructed and arranged to function as an equalizer up to a predetermined pressure in the system and thereafter to segregate the systems and function as a safety device in the event of leakage or breakage in either of the systems.

An object of the invention is to provide a hydraulic brake system including two separate systems interconnected by mechanism operable to equalize the systems up to a predetermined pressure, and thereafter to segregate the systems and function as a safety device in the event of leakage in or breakage of either of the separate systems.

Other objects of the invention will appear from the following description taken in connection with the drawing which forms a part of this specification, and in which,—

Figure 1 is a diagrammatical illustration of a hydraulic brake system embodying the invention, and Figure 2 is an enlarged sectional view of the equalizer mechanism.

Referring to the drawing, 10 and 12 represent corresponding cylinders arranged in parallel relation to one another. In practice, these cylinders are suitably connected to a source of fluid supply substantially as disclosed in my copending application Serial No. 586,474, filed January 9, 1932.

The cylinder has a discharge port 14 controlled by a valve 16 and connected by a conduit 18 and branched conduits 20 and 22 to fluid pressure motors 24 and 26 arranged for the actuation of a pair of brakes for a motor vehicle; and the cylinder 12 has a discharge port 28 controlled by a valve 30 connected by a conduit 32 and branched conduits 34 and 36 to fluid pressure motors 38 and 40 arranged for the actuation of another pair of brakes for the motor vehicle.

As shown, each brake includes a fixed support or backing plate 42 on which one of the fluid pressure motors is mounted, a rotatable drum 44 associated with the backing plate, and corresponding friction elements 46 pivoted to the backing plate and adapted to be moved by the motor into engagement with the drum against the resistance of a retractile spring 48 connected between the friction elements.

Reciprocable pistons 50 and 52 in the respective cylinders 10 and 12 have on their respective heads corresponding leak-proof cups 54 and 56, and springs 58 and 60 interposed between the respective cups 54 and 56 and the respective valves 16 and 30 serve to retain the cups and valves against displacement and to return the respective pistons to their retracted positions. The respective pistons are movable on their compression strokes by corresponding thrust rods 62 and 64 suitably connected to a rock shaft 66 having keyed or otherwise secured thereto the foot pedal lever 68.

Arranged transversely to the cylinders 10 and 12 is a cylinder 70. This cylinder has a diaphragm 72 dividing the cylinder into two corresponding double diametral chambers 74 and 76, and the diaphragm has an orifice 78 providing a communication between the chambers. The chambers 74 and 76 are vented to the atmosphere as at 80 and 82, and threaded in the open end of the chambers are heads 84 and 86.

The head 84 has a concentric extension 88 terminating in a conical end 90. This extension protrudes into the chamber 74 and is provided with a diametral passage 92 communicating with an axial passage 94 in the head, and a fitting 96 threaded in the passage 94 is connected in the conduit 18. Similarly the head 86 has a concentric extension 98 terminating in a conical end 100. This extension protrudes into the chamber 76 and is provided with a diametral passage 102 communicating with an axial passage 104 in the head, and a fitting 106 threaded in the passage 104 is connected in the conduit 28.

Pistons 108 and 110 are mounted for reciprocation in the chambers 74 and 76. The piston 108 has oppositely disposed heads 112 and 114 of different diameters corresponding to the different diameters of the chamber 74. The head 112 has a concentric extension 116, and the head 114 has a concentric extension 118 terminating in a conical end 120 adapted to seat in the orifice 78 and to close communication between the chambers 74 and 76, and the extension 118 has a diametral passage 122 communicating with an axial passage 124 extending through the piston 108 and the extensions 116 and 118. The open end of this passage is adapted to receive the conical end 90 of the extension 88 on the head 84 to close the passage 124. A leak-proof cup 126 sleeved on the extension 116 is seated on the head 112, and another leak-proof cup 128 sleeved on the extension 118 is seated on the head 114. These cups prevent the passage of fluid to the rear of the respective piston heads, and a relatively heavy spring 130 is interposed between the diaphragm 72 and the cup 128 on the head 114. This spring urges the piston 108 to its seat on the conical end 90 of the extension 88 on the head 84, in which position the passage 124 is closed.

Similarly, the piston 110 has oppositely disposed heads 132 and 134 of different diameters corresponding to the different diameters of the chamber 76. The head 132 has a concentric extension 136, and the head 134 has a concentric extension 138 terminating in a conical end 140 adapted to seat in the orifice 78 and to close communication between the chambers 74 and 76, and the extension 138 has a diametral passage 142 communicating with an axial passage 144 extended through the piston 110 and the extensions 136 and 138. The open end of the passage 144 is adapted to receive the conical end 100 of the extension 98 on the head 86 to close the passage 144. A leak-proof cup 146 sleeved on the extension 136 is seated on the head 132, and another leak-proof cup 148 sleeved on the extension 138 is seated on the head 134. These cups prevent the passage of fluid to the rear of the piston heads, and a relatively heavy spring 150 interposed between the diaphragm and the cup 148 urges the piston to its seat on the conical head 100 of the extension 98 on the head 86, in which position the passage 144 is closed.

In a normal operation of the brakes, when force is applied to the foot pedal lever 68 the shaft 66 to which the lever is secured is rocked, and this movement of the shaft is transmitted through the thrust rods 62 and 64, suitably connected to the shaft, to the pistons 50 and 52 resulting in moving these pistons on their compression strokes. As the pistons move on their compression strokes fluid is discharged from the cylinders 10 and 12 past the valves 16 and 30 and through the conduits 18 and 28 into the fluid pressure motors 24, 26, 38 and 40, resulting in actuation of the motors with consequent movement of the friction elements 46 into engagement with the drums 44 against the resistance of the retractile springs 48.

Upon release of the foot pedal lever 68 a retractile spring, not shown, returns this lever to its normal position. As the foot pedal lever returns to its normal position the shaft 66 is rocked in reverse direction, and this movement of the shaft retracts the thrust rods 62 and 64 resulting in release of the pistons 50 and 52. Upon release of the pistons, the springs 58 and 60 urge the pistons to their retracted positions. As the pistons are urged to their retracted positions, fluid is returned from the fluid pressure motors 24, 26, 38 and 40 to the cylinders 10 and 12 due to the tension on the retractile springs 48 connected between the respective pairs of friction elements.

Under normal conditions of operation the pressure developed in the conduits 18 and 28 is substantially equal. Thus the pistons 108 and 110 move away from their respective seats immediately upon movement of the pistons 50 and 52 on their compression strokes. This movement of the pistons from their seats opens the passages 124 and 144 and establishes communication between the conduits 18 and 28, resulting in equalization of the pressure in the separate systems. This equalized pressure in the systems is maintained for a period of time during which the motors 24, 26, 38 and 40 are actuated to move the friction elements 46 into engagement with the drums 44. Upon attaining a predetermined pressure, the pistons 108 and 110 are moved sufficiently to seat the conical ends 120 and 140 of the extensions on the respective pistons 108 and 110 in the respective ends of the orifice 78 in the diaphragm 72. This results in closing communication between the conduits 18 and 28 and segregating the systems for independent yet concomitant operation wherein the failure of one system would not in any way effect the other; and upon release of the pressure the pistons 108 and 110 are returned respectively under the influence of the respective springs 130 and 150 to their respective seats, wherein communication between the separate systems is again closed.

In an abnormal condition of operation, due to leakage or breakage of either of the separate systems, pressure in the defective system may or may not be sufficient to cause movement of the piston 108 or the piston 110, as the case may be, from its retracted position. Should the differential of pressure in the separate systems be of such magnitude as to cause the piston 108 to move from its seat or retracted position and not sufficient to cause movement of the piston 110 from its seat or retracted position, fluid would flow through the passages 124 and 122 in the piston 108 and the orifice 78 in the diaphragm 72 to the head 134 of the piston 110, and impose pressure on the head 134, which pressure when augmented by the tensile strength of the spring 150 would equal the pressure on the head 112 of the piston 108. Under this condition, as the pressure is built up in the respective systems, the differential in pressure remains substantially constant, resulting in the retention of the piston 110 on its seat or in its retracted position wherein communication between the separate systems is closed, and thus the separate systems would operate individually.

Should the differential in pressure in the separate systems be so small that both of the pistons 108 and 110 are caused to move from their retracted positions, communication between the separate systems would be established with the resultant equalization of pressure in the systems. However, should the pressure on the head 112 of the piston 108 be greater than the pressure on the head 132 of the piston 110, the piston 110 would gradually move to its seat or retracted position because the pressure on the head 112 of the piston 108 is transmitted to the head 134 on the piston 110 and is augmented by the tensile strength of the spring 150. When the piston 110 is moved to its retracted position, communication between the systems is closed, and upon reaching a predetermined pressure on the head 112 of the piston 108, the conical end 122 of the extension on the piston 108 seats in the orifice 78 in the diaphragm 72, completely sealing communication between the separate systems.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A fluid braking system comprising a pair of compressors, means for actuating the compressors in unison, and interconnected corresponding fluid pressure valves connected respectively to the respective compressors and operable by fluid under pressure in the compressors to first establish communication between the compressors and secondly to intercept the communication between the compressors upon further increase in fluid pressure.

2. A fluid braking system comprising a pair of compressors, a fluid pressure motor connected to each of the compressors, braking elements actuated by the motors, means for actuating the compressors in unison, oppositely disposed interconnected differential fluid pressure valves connected respectively to the respective compressors and operable upon initial pressure in the compressors to establish communication between the compressors, and at a predetermined higher pressure to intercept the communication between the compressors, and upon a difference of pressure in the compressors to segregate the compressor having the lower pressure.

3. A fluid braking system comprising a pair of compressors, a fluid pressure motor connected to each of the compressors, braking elements actuated by the fluid pressure motors, means for actuating the compressors in unison, oppositely disposed double diametral interconnected cylinders connected respectively to the respective compressors, a double-headed piston reciprocal in each of the cylinders having a passage therethrough, seats for said pistons, means urging the pistons to their seats, means for closing the passage in the pistons when the pistons are seated, and other means carried by the pistons to close the connection between the cylinders upon attaining a predetermined pressure in the compressors.

4. A fluid pressure system comprising a pair of compressors, means operated by said compressors, a passageway connecting said compressors, normally closed valve means for inhibiting flow through said passageway until the fluid pressure created by said compressors reaches a predetermined value, normally open valve means for closing said passageway when the fluid pressure reaches a higher value than said predetermined value, and fluid pressure actuated means for operating said valve means.

5. A fluid pressure system comprising a pair of compressors, means operated in response to fluid pressure created by said compressors, a passageway connecting said compressors, valve means in said passageway normally effective to cut off fluid communication therethrough, fluid pressure responsive means to open said last-named means upon the creation of a predetermined fluid pressure, and normally ineffective means in said passageway operable upon the creation of a fluid pressure higher than said predetermined pressure to close said passageway.

6. A fluid pressure system of the class described, comprising a pair of compressors, a fluid pressure motor connected to each compressor, a conduit connecting each motor with its compressor, a passageway connecting said conduits, a pair of fluid-operated pistons in said conduit, and a pair of alternately-operated, passageway-controlling valves controlled by each piston whereby said passageway is closed when either piston is in either of its extreme positions.

7. In a hydraulic braking system of the class described the combination of a pair of compressors, a fluid pressure motor connected to each compressor, braking elements actuated by said motors, conduit means connecting said motors with said compressors, a passageway connecting said compressors, a pair of differential pistons in said passageway, a pair of valves associated with each piston whereby said passageway is closed when either piston is in either of its extreme positions, and means biasing each piston and normally maintaining one of its valves in closed position.

8. A fluid pressure system of the class described, comprising a pair of compressors, a mechanism connected to each compressor and operated in response to fluid pressure created thereby, a passageway connecting said compressors, valve means in said passageway cutting off communication therethrough until a predetermined fluid pressure is created by said compressors, means for opening said valve means upon the creation of said predetermined fluid pressure, and other valve means for closing communication through said passageway upon the creation of a second predetermined and higher pressure.

9. In a fluid pressure system of the class described, the combination of a pair of compressors, means actuated thereby, a passageway connecting said compressors, normally closed valve means in said passageway, mean for opening said valve means only upon the creation of a predetermined fluid pressure by both of said compressors, and means for closing said passageway upon the creation of a higher pressure by either of said compressors.

10. In a fluid pressure system of the class described, the combination of a pair of compressors for creating fluid pressure, a passageway connecting said compressors, means for actuating the compressors in unison, a pair of pistons in said passageway, each end of each piston comprising a valve element, a pair of spaced stationary valve elements for each piston for cooperation with the valve elements formed by the ends of the pistons, and means for biasing said pistons.

HERBERT C. BOWEN.